3,173,951
PREPARATION OF IMIDOYL HALIDES FROM
TERTIARY PHOSPHINES AND AMIDES
Angelo John Speziale, Creve Coeur, and Lowell R. Smith, St. Louis, Mo., assignors to Monsanto Company, a corporation of Delaware
No Drawing. Filed Mar. 16, 1962, Ser. No. 180,344
8 Claims. (Cl. 260—566)

This application relates to a novel procedure for preparing useful chemical compounds. More specifically, the invention is directed to a method of preparing imidoyl halides from carboxylic acid amides by a procedure which may be characterized by the equation,

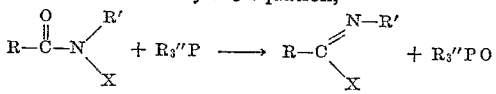

wherein X is a halogen of the group consisting of chlorine or bromine and each of R and R' are selected from the class consisting of the hydrocarbon radicals of the class consisting of aliphatic radicals (alkyl, alkenyl and alkynyl radicals) of up to 18 carbon atoms, cycloaliphatic radicals of 5 to 7 carbon atoms, the phenyl radical, and the naphthyl radical; and the said hydrocarbon radicals containing substituents of the class consisting of the nitro radical, alkyl radicals of up to four carbon atoms, alkoxy radicals of up to four carbon atoms, the phenyl radical, the cyano radical, the naphthyl radical, chlorine and bromine.

Suitable amides for effecting the reaction are:
N-chloro-N-ethyl benzamide
N-bromo-N-acetanilide
N-chloro-N-butyl propionamide
N-chloro-N-cyclohexyl-3-ethyl ethyloxybutyramide
N-bromo-N-benzyl cyclohexylacetamide
N-chloro-N-naphthyl capramide
N-chloro-N-p-chlorobenzyl naphthylamide
N-bromo-p-chloroacetanilide
N-chloro-N-allylacetamide
N-chloro-N-ethoxyethyl acetamide
N-chloro-N(3,5-dibromo) benzyl cyclopentylamide
N-bromo-2,4-dinitro acetanilide
N-chloro-N-ethyl stearamide
N-chloro-N-dodecyl acrylamide
N-chloro-N-methyl sorbamide
N-bromo-N-phenyl caprylamide
N-chloro-N-phenethyl valeramide
N-chloro-N-cinnamyl acetamide In the conversion of these amides to the imidoyl halides tertiary phosphines or esters of a trivalent phosphorus acid may be used. These may be described generically by the structural formula

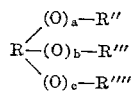

wherein $a$, $b$ and $c$ are integers from zero (0) to one (1); and wherein R'', R''' and R'''' are organic radicals defined above with respect to the symbols R and R'. Compounds of this group are for example:

Triphenyl phosphine
Diethyl allyl phosphine
Tri-n-butyl phosphite
Diethyl phenylphosphinite
Cyclohexyl diethylphosphinite
Diethylphenyl phosphine
Phenyldimethyl phosphite
Dibenzyl ethylphosphonite
Cyclopentenyl-di(n-butyl)phosphinite
Tri(2-ethyl)hexyl phosphine
Dibenzyl phenylphosphonite
Dimethylphenyl phosphine
Diallyl ethylphosphonite
Triethyl phosphite
Diethyl ethylphosphonite
Ethyl diphenylphosphinite
Cyclopentyldiethyl phosphine
Triisopropyl phosphite
Dodecynyl dimethylphosphinite
Dihexyl phenylphosphonite
Tri(n-butyl)phosphine
Tribenzyl phosphine Since no part of this phosphorous compound enters the product it is not important which of the many phosphines or esters of phosphorous acid is used.

The following are examples of products obtained by the practice of the novel procedure.

In effecting these preparations the N-substituted amides are mixed with the trivalent phosphorus compound usually resulting in an exothermic reaction. The reactants are usually combined gradually so as to maintain the reaction temperature below a predetermined maximum. It is frequently desirable to control the reaction by using an inert organic solvent as a diluent so as to slow up the reaction. The solvent may also be used to cool the reaction mass by operating at reflux temperatures with a low boiling solvent, such as ether, and under vacuum, if necessary, to effect a very low temperature of reaction. At reflux the sensible heat can be removed by a water or ice-cooled condenser.

The products can usually be separated from residual reactants, by-products and impurities by fractional distillation, preferably under suitable vacuums. Frequently products of high molecular weight are solids at room temperatures and crystallize upon cooling. These products may be purified by recrystallization from a suitable solvent, such as hexane. In some cases, both distillation and crystallization may be used in sequence, the distillation removing the reaction solvents and low boiling products and the resulting purified product then crystallized from a selected solvent.

Further details of the novel reaction are set forth in the following example.

*Example I*

A solution of N-chloro-N-ethylbenzamide in benzene was stirred while a solution of triphenylphosphine in benzene was added at such a rate that the temperature remained below 40°. The solution was heated at 50° for 15 min. and the benzene was removed in vacuo, and distillation gave a yellow liquid which on redistillation gave N-ethylbenzimidoyl chloride, B.P. 51° (0.25 mm.), $n_D^{21}$ 1.5507.

By repeating the procedure of Example I except by substituting each of the amides described above the following imidoyl halides are prepared in sequence:

N-phenyl acetimidoyl bromide
N-butyl propionimidoyl chloride
N-cyclohexyl-3-ethyloxybutyrimidoyl chloride
N-allyl acetimidoyl chloride
N-benzyl cycloheximidoyl bromide
N-naphthyl caprimidoyl chloride
N-p-chlorobenzyl naphthimidoyl chloride
N-ethyl acrylamidoyl chloride
N-p-chlorophenylacetimidoyl bromide
N-ethoxyethyl acetimidoyl chloride
N(3,5-dibromo)benzyl cyclopentimidoyl chloride
N-2,4-dinitrophenyl acetimidoyl bromide
N-ethyl stearamidoyl chloride
N-cinnamyl acetimidoyl chloride
N-dodecyl acrylamidoyl chloride
N-methyl sorbamidoyl chloride
N-phenyl caprylamidoyl bromide
N-phenethyl valeramidoyl chloride

What is claimed is:

1. The method of preparing compounds of the structure:

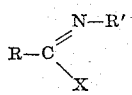

wherein X is selected from the group consisting of chlorine and bromine and wherein R is selected from the group consisting of phenyl, naphthyl, cycloalkyl having 5 to 7 carbon atoms, cycloalkenyl having 5 to 7 carbon atoms, alkyl having up to 18 carbon atoms, alkenyl having up to 18 carbon atoms and alkynyl having up to 18 carbon atoms; and wherein R' is selected from the group consisting of alkyl having up to 18 carbon atoms, alkenyl having up to 18 carbon atoms, cycloalkyl having from 5 to 7 carbon atoms, the alkoxy radical having up to 18 carbon atoms and the non-aliphatic hydrocarbon radicals of the group consisting of phenyl, benzyl, naphthyl, phenethyl, cinnamyl and the said non-aliphatic hydrocarbon radicals having substituents selected from the group consisting of chloro, bromo and nitro; which comprises contacting amides of the structure:

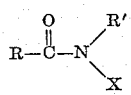

with a compound of the structure:

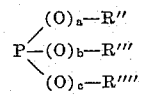

wherein $a$, $b$ and $c$ are each integers from 0 to 1 and wherein R'', R''' and R'''' are selected from the group consisting of alkyl having up to 18 carbon atoms, alkenyl having up to 18 carbon atoms, alkynyl having up to 18 carbon atoms, cycloalkyl having 5 to 7 carbon atoms, cycloalkenyl having 5 to 7 carbon atoms, phenyl and benzyl.

2. The method of preparing compounds of the structure

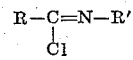

wherein R and R' are alkyl radicals of up to 18 carbon atoms, which comprises heating at reflux temperature in an inert organic solvent a compound of the structure

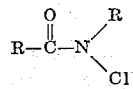

in the presence of a compound of the structure

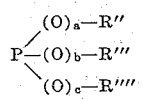

wherein $a$, $b$ and $c$ are integers from zero (0) to one (1) and R'', R''' and R'''' are alkyl radicals of up to 12 carbon atoms.

3. The method of preparing compounds of the structure

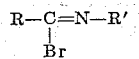

wherein R and R' are alkyl radicals of up to 18 carbon atoms, which comprises heating at reflux temperature in an inert organic solvent a compound of the structure

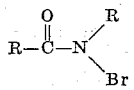

in the presence of a compound of the structure

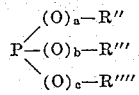

wherein $a$, $b$ and $c$ are integers from zero (0) to one (1) and R'', R''' and R'''' are alkyl radicals of up to 12 carbon atoms.

4. The method of preparing N-methylbenzimidoyl chloride which comprises gradually combining an inert organic solvent solution of triphenyl phosphine with a solution of N-chloro-N-ethyl benzamide.

5. The method of preparing N-phenylacetimidoyl chloride which comprises gradually combining an inert organic solvent solution of triethyl phosphite and a solution of N-chloro-N-phenyl acetamide.

6. The method of preparing N-ethyl butyrimidoyl bromide which comprises gradually combining organic solvent solutions of diethyl methyl phosphonite and N-bromo-N-ethyl butyramide.

7. The method of preparing N-cyclohexyl propionimidoyl chloride which comprises gradually combining diethyl phenyl phosphinite with N-chloro-N-cyclohexyl propionamide.

8. The method of preparing N-methyl acetimidoyl chloride which comprises gradually mixing triethyl phosphine and N-chloro-N-methyl acetamide.

References Cited in the file of this patent

Kreutzkamp et al.: Naturwissenschaften, vol. 42, p. 415 (1955).

Braun et al.: Ber. Deut. Chem., vol. 55, pp. 3165–3170 (1922).